Figure 1:
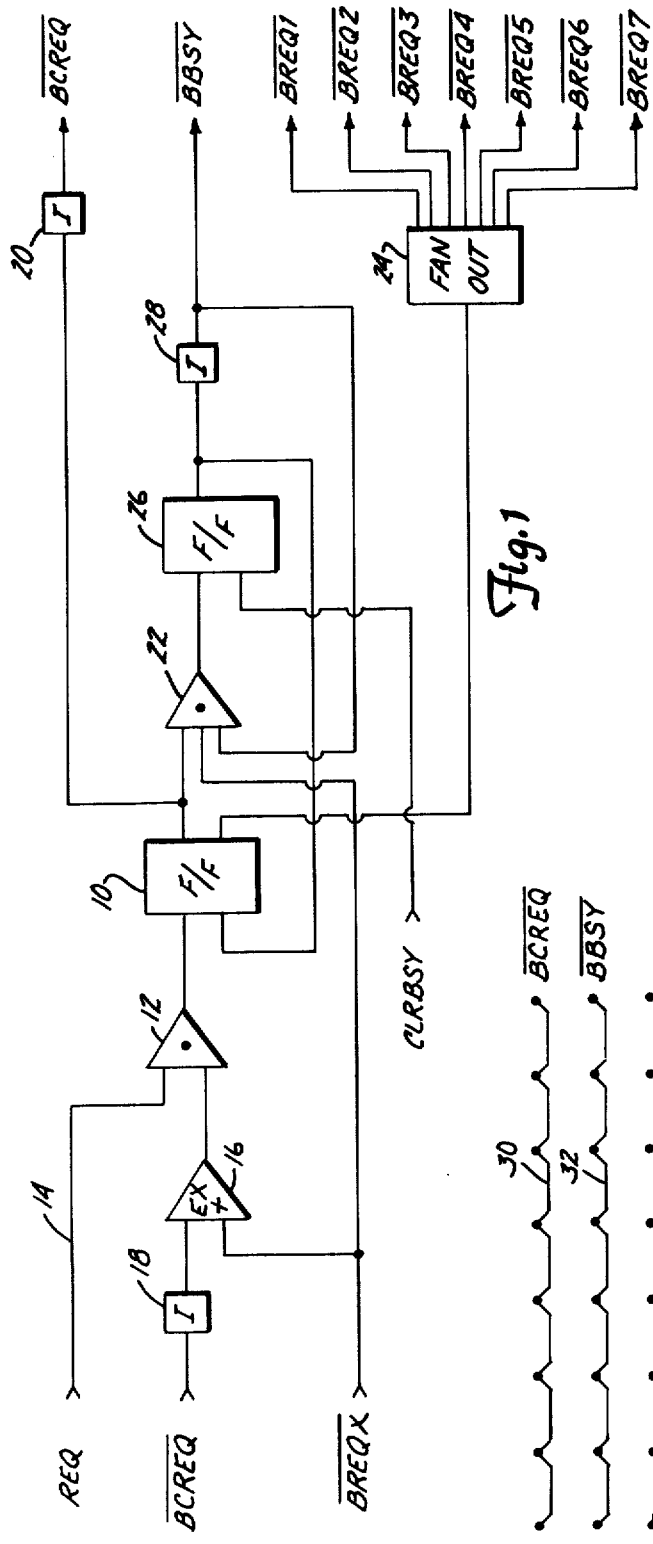

United States Patent [19]

Nystrom

[11] 4,454,581

[45] Jun. 12, 1984

[54] BUS CONTENTION CIRCUIT

[75] Inventor: Michael C. Nystrom, New Brighton, Minn.

[73] Assignee: Control Data Corporation, Minneapolis, Minn.

[21] Appl. No.: 383,900

[22] Filed: Jun. 1, 1982

[51] Int. Cl.³ .......................................... G06F 364/200
[52] U.S. Cl. ..................................................... 364/200
[58] Field of Search ............................... 364/200, 900

[56]     References Cited
       U.S. PATENT DOCUMENTS 4,384,323  5/1983  Ahyja ................................ 364/200

OTHER PUBLICATIONS

"Unibus Adapter Technical Description" Digital Equipment Corporation, 1978.

*Primary Examiner*—Gareth D. Shaw
*Assistant Examiner*—Tim A. Wiens
*Attorney, Agent, or Firm*—R. M. Angus; J. A. Genovese

[57]           ABSTRACT

A bus contention circuit, is employed for each unit of a system capable of seizing use of a bus, wherein the units are arranged in a priority order. Priority resolution is accomplished by registering a request to seize use of the bus from any unit where either (1) no other requests are so registered or (2) the requesting unit is of lower priority than a unit whose request is already registered. When the bus becomes available for use, use is allocated to the unit with highest priority whose request is already registered.

13 Claims, 2 Drawing Figures

BUS CONTENTION CIRCUIT

This invention relates to a bus contention circuit, and particularly to a circuit for establishing service priority among computer devices sharing the use of a bus channel.

It is desirable to establish priority of use among the several computer units sharing the use of a bus channel. In a typical arrangement, several active units, each capable of seizing use of a communications bus, are connected to the bus to share communications over the bus. However, to avoid conflicts between several units seizing use of the channel simultaneously, a priority is ordinarily established among the users. One technique has been to establish a rigid priority among the several users of the bus so that if two or more users seek use of the bus, priority is always given to that unit having the highest assigned priority. One problem with such a technique, however, is that a few users with relatively high priorities can preclude the ability of a unit with low priority from seizing use of a channel.

It is an object of the present invention to provide a bus contention circuit wherein the several units are assigned a priority, yet providing the opportunity for lower-ordered units to seek access to the bus even if higher-ordered units seek such access.

In accordance with the present invention, the units are arranged in a priority arrangement. The priority resolving apparatus includes register means for registering a request for any unit where either (i) no other requests are so registered, or (ii) the requesting unit has a lower priority than the unit of highest priority whose request is already registered. When the bus becomes free, allocation is accorded to the unit with highest priority whose request is registered.

One feature of the present invention resides in the provision of a pair of J-K flip-flops, clocked with a 16 MHz clock, for each active unit capable of seizing use of the bus. The first flip-flop is a bus request flip-flop which, when set, generates bus request signals to all units with lower priority. The bus request flip-flop is not permitted to set if requests are pending, all of which are lower in priority. However, if a request is pending which is higher in priority, the bus request flip-flop is permitted to set. The second flip-flop, a bus busy flip-flop can be set by the bus request flip-flop one cycle after the bus becomes free if no active request exists from higher priority units.

Another feature of the invention resides in the fact that when the bus is active or busy, a request from a particular unit to seize use of a channel is honored only if no other requests are pending or if the unit seeking the request is of lower priority than at least one other unit whose request is also pending. When the bus subsequently becomes inactive, use of the bus is allocated to that unit having the highest priority and an active request. For example, if there are eight units capable of seizing use of the bus, and an active request exists for the fourth unit, subsequent requests will not be honored from any unit having a higher priority than unit four; requests will be only honored from units having priorities lower than unit four. Consequently, when the channel subsequently becomes inactive, unit four, which has the highest priority of the units having active requests, is allocated use of the channel.

Another feature of the present invention resides in the fact that units of relatively high priority are prevented from monopolizing use of the bus, thereby insuring that all units have an opportunity to access to the bus.

Figure 2:
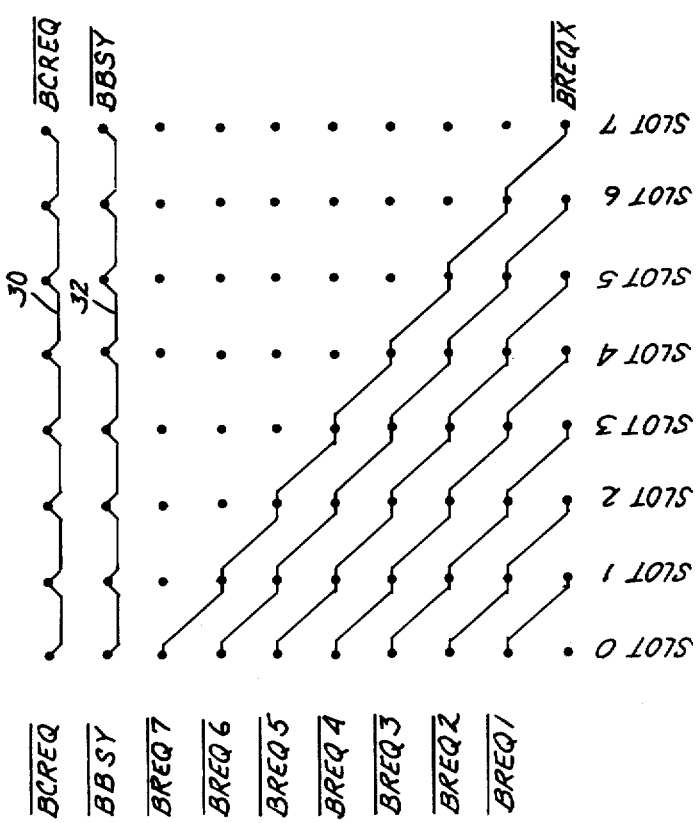

The above and other features of this invention will be more fully understood from the following detailed description and the accompanying drawings, in which:

FIG. 1 is a block circuit diagram of the bus contention circuit in accordance with the presently preferred embodiment of the present invention; and FIG. 2 is a wiring diagram illustrating the interconnection of the bus contention circuits for the several units connected to the bus.

With reference to the drawings, and particularly to FIG. 1, there is illustrated a block circuit diagram of a bus contention circuit in accordance with the presently perferred embodiment of the present invention, one such circuit being employed for each active unit connected to a bus (not shown). The circuit includes a bus request flip-flop 10 having its set input connected to the output of AND gate 12. AND gate 12 receives a request signal from the unit (not shown) via lead 14, and a second input from the output of EXCLUSIVE OR gate 16. EXCLUSIVE OR gate 16 receives a $\overline{BREQX}$ signal at one input and a $\overline{BCREQ}$ signal through inverter 18 at the second input. The set output of flip-flop 10 provides, through inverter 20, the $\overline{BCREQ}$ signal, and provides a first input to AND gate 22. The reset output of flip-flop 10 is provided through fan out circuit 24 to provide respective $\overline{BREQ1}$ through $\overline{BREQ7}$ signals. AND gate 22 also has a second input connected to receive the $\overline{BREQX}$ signal. The output of AND gate 22 is connected to the set input of bus busy flip-flop 26, which in turn provides an output through inverter 28 to provide a $\overline{BBSY}$ signal output. Also, the output of flip-flop 26 is provided to the reset input of flip-flop 10, and the $\overline{BBSY}$ signal is provided as a third input to AND gate 22. Flip-flop 26 is reset by signal CLRBSY.

FIG. 2 illustrates the wiring diagram of a back panel for interconnecting the contention circuits illustrated in FIG. 1. As shown in FIG. 2, the $\overline{BCREQ}$ signals are wired (ORed) together by wire 30 and the BBSY signals are wired (ORed) together by wire 32. The $\overline{BREQ1}$ through $\overline{BREQ7}$ signals are wired in such a way that the $\overline{BREQX}$ signal of the contention circuit for each respective slot comprises the $\overline{BREQ1}$ through $\overline{BREQ7}$ signals from cards or units of higher priority. For example, the contention circuit representing the card or unit in slot 0 provides signals onto each of the leads $\overline{BREQ1}$ through $\overline{BREQ7}$ to provide a $\overline{BREQX}$ signal to each of the lower-ordered cards, whereas, for example, the card in slot 4 provides $\overline{BREQX}$ signals only to the cards in slots 5, 6 and 7.

With the foregoing in mind, operation of the apparatus illustrated in the drawings may now be explained. Assuming initially that the bus is not busy and that there are no requests for use of the bus, this system is, of course, dormant. Flip-flops 10 and 26 in all contention circuits are both in a reset condition so that the $\overline{BCREQ}$ signal is high (through inverter 20), the $\overline{BREQ1}$ through $\overline{BREQ7}$ signals are also high, and consequently the $\overline{BREQX}$ signal to all circuits is high. Preferably, the $\overline{BREQX}$ signal in slot 0 is tied to a permanent high signal source. The conditions at EXCLUSIVE OR gate 16 are such that the $\overline{BCREQ}$ signal through inverter 18 is low whereas the $\overline{BREQX}$ signal is high. EXCLUSIVE OR gate 16 will provide an output when either, but not both, of its inputs are high. Consequently, EXCLUSIVE OR gate 16 provides a high signal to the lower input of AND gate 12.

If a unit becomes ready to seize use of the bus, a request signal from the unit is imposed on lead 14 to AND gate 12 thereby causing the AND gate to provide a high input to flip-flop 10 thereby setting the flip-flop upon the next clock cycle. The set output of flip-flop 10 provides a high signal output to inverter 20, thereby driving $\overline{BCREQ}$ low. Also, the setting of flip-flop 10 places a high signal to one input of AND gate 22. Since the $\overline{BBSY}$ signal is high (because no flip-flop 26 is set) and because the $\overline{BREQX}$ signal is high, AND gate 22 operates to set flip-flop 26 thereby driving the $\overline{BBSY}$ signal low, thereby indicating the channel is busy. Preferably, flip-flop 26 is also connected to the unit (not shown) to enable the unit to seize use of the bus. Therefore, the unit which has requested use of the bus has seized use of the bus and the bus is busy. The setting of flip-flop 26 resets the respective flip-flop 10 thereby providing a low signal to fan out circuit 24, driving or releasing the $\overline{BREQX}$ signals high to all units with a lower priority. Furthermore, with signal $\overline{BBSY}$ low, the conditions at all of the AND gates 22 are such as to prevent the setting of any further flip-flops 26.

If, during the time that the channel is busy, a request from another unit comes in to its contention circuit, its respective flip-flop 10 is set (assuming no other requests had yet been made). This occurs because all the $\overline{BREQX}$ signals are high as are the $\overline{BCREQ}$ signals so that the condition at EXCLUSIVE OR gates 16 are such as to provide a high signal output to AND gates 12. Consequently, a request on a line 14 will set the respective flip-flop 10 as heretofor described. However, because $\overline{BBSY}$ signal is low, the respective AND gate 22 will not pass a signal to set the respective flip-flop 26. Therefore, the subsequent request will not cause seizure of the bus. Instead, flip-flop 10 is set, thereby driving the $\overline{BREQX}$ signal in lower-ordered units low and driving $\overline{BCREQ}$ signals in all units low. The $\overline{BREQX}$ signals to higher-ordered units remains high.

During the time when the bus is busy and a request is registered in flip-flop 10 of a particular unit, if a lower-ordered unit requests priority on its line 14, the conditions are such that the $\overline{BREQX}$ and $\overline{BCREQ}$ signals are low (at the lower-ordered unit). Consequently, EXCLUSIVE OR gate 16 receives a high input from inverter 18 and a low input $\overline{BREQX}$ signal. Thus, AND gate 12 is operated when a high signal appears on lead 14 to thereby set the flip-flop 10 and provide a continued low output on the respective outputs of fan out 24. However, if a request is made on line 14 of a higher-ordered unit, AND gate 16 is not operated due to the high condition of the $\overline{BREQX}$ signal. Therefore, if the channel is busy and a request is registered from another unit, additional requests will only be registered in units having a lower priority than the highest one registered. For example, if the bus is busy and an outstanding request exists from unit four, subsequent requests from any of the units in lower-ordered priority units five, six or seven will cause setting of their respective flip-flops 10, but a request from a higher-ordered unit (higher than the unit in slot four) will not set the respective flip-flop 10. When the bus is released by the unit using it, that unit will generate a CLRBSY signal to its flip-flop 26, thereby resetting the flip-flop and driving or releasing the $\overline{BBSY}$ signal high. Thereafter, the unit with the highest priority and having its flip-flop 10 in a set condition (unit four in the example) will cause its flip-flop 26 to be set one clock cycle after release of the channel. This is because the $\overline{BBSY}$ signal goes high when the channel becomes free thereby permitting the AND gate 22 to operate. (The middle input of AND gate 22 is already high because the $\overline{BREQX}$ signal is high due to the reset condition of all flip-flops 10 associated with units of higher priority.) However, any units with yet lower priorities for which requests are outstanding, will not have their flip-flops 26 set because the flip-flop 10 in the now honored unit is initially in a set condition thereby rendering the $\overline{BREQX}$ signal low in each lower-ordered unit. Flip-flop 10 in the now honored unit is reset one clock cycle after its flip-flop 26 becomes set.

Preferably, for simplicity of circuit design, all output signals are open collector signals, $\overline{BCREQ}$ and $\overline{BBSY}$ being held high by one unit and driven low by any unit and $\overline{BREQX}$ being held high for each unit and driven low by any unit of higher priority. Therefore, when a signal is returned to its high state, it is released high.

The present invention thus provides a bus contention circuit for resolving contention among users of a bus wherein requests for use of the channel are registered only for units having lower priority than the highest ordered unit whose request is registered. Use of the bus is accorded to the highest-ordered unit having a request so registered. Therefore, higher-ordered units are precluded from monopolizing use of the channel. The circuit is rapid in operation in that requests are honored within one clock cycle of the channel becoming free. The circuit is effective in operation, simple in design, and inexpensive to manufacture, operate and maintain.

One feature of the invention resides in the fact that the system may be expanded to accommodate any number of units merely by expanding the back panel pattern (FIG. 2) and the outputs of fan-out circuit 24.

This invention is not to be limited by the embodiment shown in the drawings and described in the description, which is given by way of example and not of limitation, but only in accordance with the scope of the appended claims.

What is claimed is:

1. A contention circuit for resolving priority conflicts between a plurality of priority-ordered units capable of seizing a bus comprising, at each unit: bus request storage means operable to store a signal representative of a request by the respective unit to seize use of the bus, said bus request storage means providing a bus common request signal to the contention circuit associated with all the units; priority output means responsive to the operation of said bus request storage means for providing a bus request signal to each contention circuit associated with lower-ordered units; first logic means responsive to the bus common request signal from each of said contention circuits, to the bus request signals from the contention circuits from each of the higher-ordered units and to a request from the associated unit to seize use of the channel, to operate said bus request storage means upon a request from the associated unit to seize use of the channel and either the absence of a bus common request signal or the presence of both a bus common request signal and a bus request signal from a higher-ordered unit, said first logic means not operating said bus request storage means if said bus common request signal is present and no bus request signal is present from a higher-ordered unit; bus busy means for providing a bus busy signal to all of the contention circuits representative that the unit is using the bus; and second logic means responsive to the bus busy signal, to the bus request signal and to operation of the respective bus request storage means to operate the respective bus busy means upon operation of the respective bus request storage means and absence of said bus request signal from higher-ordered units and absence of said bus busy signal.

2. Apparatus according to claim 1 wherein said bus common request signal is a $\overline{\text{BCREQ}}$ signal, and said bus request signal is $\overline{\text{BREQX}}$ signal, and said first logic means comprises inverter means for inverting the $\overline{\text{BCREQ}}$ signal, EXCLUSIVE OR gate means responsive to the inverted $\overline{\text{BCREQ}}$ and the $\overline{\text{BREQX}}$ signals for providing a signal upon the presence of either but not both of the $\overline{\text{BREQX}}$ and the inverted $\overline{\text{BCREQ}}$ signals, and AND gate means responsive to a request signal from the associated unit and operation of said EXCLUSIVE OR gate means to operate said bus storage request means.

3. Apparatus according to claim 2 wherein said bus busy signal is a $\overline{\text{BBSY}}$ signal, and said second logic means comprises second AND gate means responsive to said $\overline{\text{BREQX}}$ and $\overline{\text{BBSY}}$ signals and to operation of the respective bus request storage means to operate the respective bus busy means.

4. Apparatus according to claim 1 wherein said bus busy signal is a $\overline{\text{BBSY}}$ signal and said bus request signal is a $\overline{\text{BREQX}}$ signal, said second logic means comprising AND gate means responsive to said $\overline{\text{BREQX}}$ and $\overline{\text{BBSY}}$ signals and to operation of the respective bus request storage means to operate the respective bus busy means.

5. Apparatus according to any of the preceeding claims wherein said bus request storage means and said bus busy means comprise flip-flops.

6. Apparatus for resolving conflicts between a plurality of units capable of seizing use of a bus, which units are arranged in a predetermined priority arrangement, said apparatus comprising: registration means for registering a request for use of the bus by a unit seeking use of the bus when either (i) no other request is so registered, or (ii) a request already is registered for a unit with higher priority, said registration means not registering a request for use of the bus if requests are already so registered and no request is registered for a unit with higher priority; and enabling means responsive to said registraton means and to the use of said bus for enabling use of the bus to the unit having highest priority whose request is registered when said bus is not being used.

7. Apparatus according to claim 6 wherein said registration means comprises, at each unit: first register means having a set and reset condition, said first register means providing, when set, a bus common request signal to all units and a bus request signal to all lower-ordered units; and first logic means responsive to a request from the respective unit for use of the bus and to either both or neither of said bus request signal and said bus common request signal to set the respective first register means.

8. Apparatus according to claim 7 wherein said enabling means comprises, at each unit: second register means having a set and reset condition, said second register means providing, when set, a bus busy signal to all units; and second logic means responsive to the set condition of said first register means and to the absence of said bus request signal and absence of said bus busy signal to set the respective second register means.

9. Apparatus according to claim 8 further including means for resetting said first register means upon setting of the respective second register means.

10. Apparatus according to either claim 6 or 7 further including means responsive to said enabling means for clearing the registration of requests in said registration means for the unit using the bus.

11. The method of resolving conflicts between a plurality of units capable of seizing use of a bus comprising: establishing a predetermined priority ordering between the plurality of units; registering a request for use of the bus by a unit seeking use of the bus when either (i) no other requests are so registered, or (ii) a request is already registered for a unit with higher priority, but not registering such a request when a request is already registered and no request is registered for a unit with higher priority; and according use of the bus to the unit having highest priority whose request is registered.

12. The method according to claim 11 further including registering subsequent requests only for those units of lower priority than the unit of highest priority whose request is already registered.

13. The method according to either claim 11 or 12 further including removing registration of requests for the unit using the bus.

* * * * *